United States Patent [19]

Nagaoka et al.

[11] 3,978,499
[45] Aug. 31, 1976

[54] WARNING DISPLAY CIRCUIT OF THE ELECTRIC SHUTTER FOR CAMERA

[75] Inventors: Shinji Nagaoka; Shogo Kato; Yukio Nakamura, all of Chiba, Japan

[73] Assignee: Seiko Koki Kabushiki Kaisha, Japan

[22] Filed: Jan. 15, 1975

[21] Appl. No.: 541,338

[30] Foreign Application Priority Data

Jan. 16, 1974 Japan................................. 49-7953

[52] U.S. Cl. ................................. 354/60 L; 354/53
[51] Int. Cl.² ............................................ G03B 7/00
[58] Field of Search............... 354/60 E, 60 L, 60 R, 354/53, 23 D

[56] References Cited
UNITED STATES PATENTS

| | | | |
|---|---|---|---|
| 3,581,634 | 6/1971 | Ort................................. | 354/60 L X |
| 3,648,053 | 3/1972 | Sato...................................... | 354/51 |
| 3,782,254 | 1/1974 | Matzuzaki et al.................. | 354/23 D |
| 3,792,648 | 2/1974 | Ishiguro............................ | 354/23 D |

Primary Examiner—L. T. Hix
Assistant Examiner—James LaBarre
Attorney, Agent, or Firm—Robert E. Burns; Emmanuel J. Lobato; Bruce L. Adams

[57] ABSTRACT

A warning light display device for an electric shutter of a camera having an exposure time control circuit for determining the exposure time of an electric shutter in dependence upon at least the brightness of an object being photographed. A warning display circuit is connected with the exposure time control circuit and has a control transistor that receives the output of the exposure time control circuit and controls the visual indication of three stages of the warning display circuit comprising light emitting diodes that indicate adequate and inadequate exposure conditions. A reference time generating circuit is provided in the warning display circuit for developing a signal representative of a predetermined time duration and a control transistor thereof controls energization of the three stages as a function of a comparison of the exposure time duration developed by the exposure time control circuit and the predetermined time duration developed by the reference time generating circuit.

1 Claim, 1 Drawing Figure

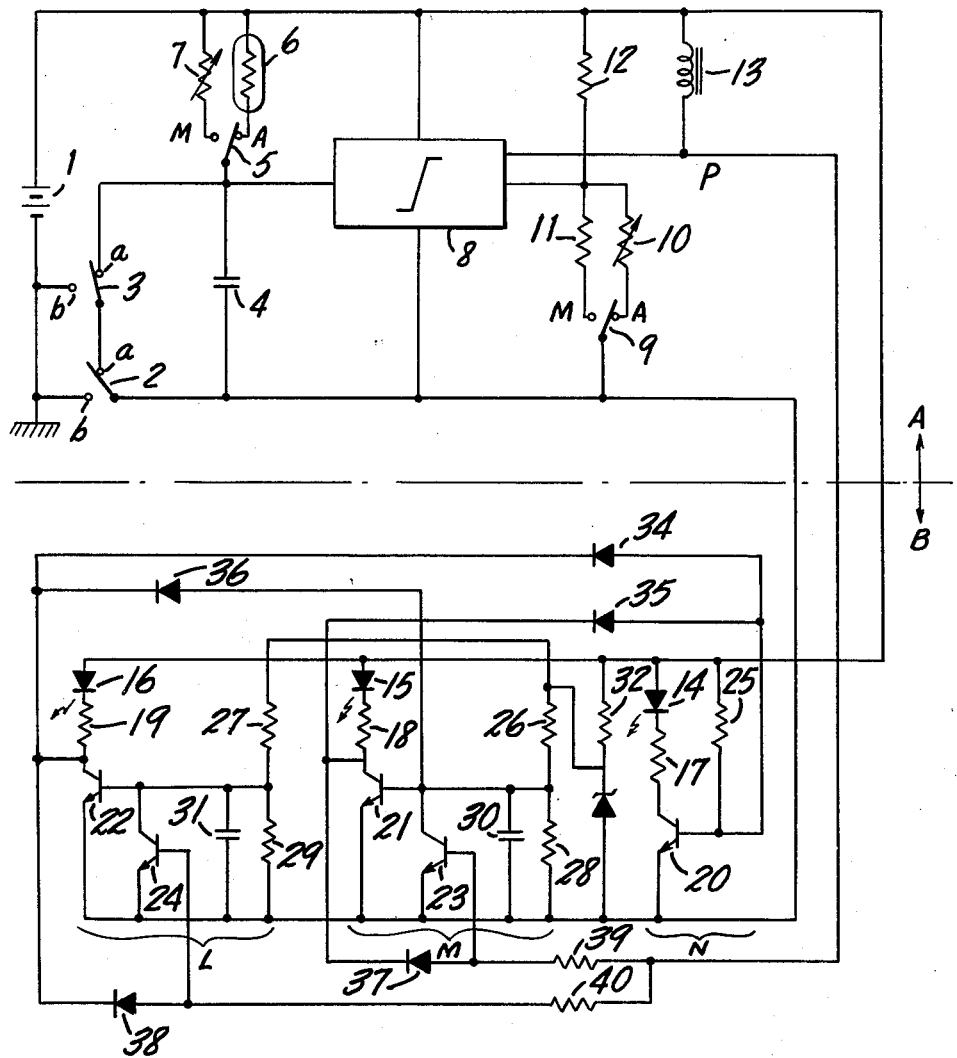

WARNING DISPLAY CIRCUIT OF THE ELECTRIC SHUTTER FOR CAMERA

BACKGROUND OF THE INVENTION

The present invention relates, to a warning display device in an electric shutter for cameras for perfection of making confirmations as to whether controlled time of exposure of the camera is within a controllable range against the brightness of the object, as well as giving warning, when such range is surpassed, and making its indication electrically.

In the prior art, one of the systems for a warning indicating device for correct exposure of the camera, has been proposed as one in which two kinds of pulses are generated: one with a pulse width in inverse proportion to the brightness of the object (corresponding to the effective time of exposure), and another with a certain width of time as reference, simultaneously, and by comparing the two, an alarm indication or indication of correct time of exposure is displayed on the camera. This known system permits a precise measurement in a wider range, when compared with the other known system giving warning by effectuating direct measurement of resistance value of photoconductive elements. However, its circuit composition becomes very complex and, consequently, its elevated cost cannot be avoided.

SUMMARY OF THE INVENTION

The present invention has eliminated this inconvenience: the warning and indication are given by effectuating comparison of the reference pulse whose width is pre-determined with a pulse having a width proportional to the brightness of the object. This invention offers a high-precision warning and display device with simple circuit composition by eliminating the complexity of the circuit composition that has been the chief demerit of the techniques of the conventional type circuitry.

The circuit composition according to this invention consists of an exposure-time controlling circuit and a warning display circuit; being the exposure-time control unit, in its turn, composed of an RC delay circuit with R, the resistance value of the photo-conductive element and shutter closing control circuit, while the display circuit, of several luminous display units and reference-time generating unit generating pulses with the pulsewidth corresponding to the reference time. By depressing the display check button provided separate from the shutter release button, the exposure-time controlling circuit and the display circuit begin to operate simultaneously, effectuating the above-mentioned warning and indicating function. However, with this operation, the effective exposing operation of the shutter will not take place, but only the output signal of the circuit controlling closing of the shutter will be electrically utilized. Up to now, the circuit composition of this type of system has been very complex, having to use special type of elements like SCR and so on, there have been many inconveniences to be encountered in practical aspect as its elevated cost and large space occupied.

BRIEF DESCRIPTION OF THE DRAWINGS

The sole FIGURE is a circuit diagram of an example of realization of the electric shutter circuit for a camera equipped with the display circuit according to the present invention.

DESCRIPTION OF THE PREFERRED EMBODIMENT

The following provides an explanation on examples of the practical realization of the present design, referring to the attached drawing. As shown in the drawing the device is divided into two blocks: A and B. A shows the exposure-time controlling circuit part and B, warning display circuit according to the present design.

1 denotes a common power source to the two circuits; 2, power source switch switchable in interlock with opening of the shutter. This is switched usually to the contact a, and when the shutter is opened, it is switched over to the contact b in interlocking movement, supplying power to the control circuit and display circuit. 3 is a switch switchable by a display button (not shown) other than the release button, supplying power to the control circuit and display circuit, not having to do with the operation of the shutter. 4 is a time limiting capacitor for forming the time of exposure of the shutter. 5 is a change-over switch between auto photographing, that is, so called E.E. and manual photographing. 6 is a photoconductive element for detecting the brightness of the object. 7 is a resistance for manual time. 8 shows a voltage level detecting circuit detecting that the voltage being charged to the capacitor 4 with time has attained to a certain level, and a reversing signal output circuit. 9 is a changeover switch between auto manual operating interlocked with the switch 5. 10 is a variable resistor for introducing exposure determining factor other than the brightness of the object such as, for instance, F value during the automatic operation. 11 is a resistance when switched to manual. 12 is a resistance for determining the detection voltage level by dividing the supply voltage connected in series with the variable resistor 10 or resistance 11. 13 is a shutter controlling magnet. 14, 15 and 16 are the light emitting diodes. 17, 18 and 19 are the current regulating resistances for each one of the light-emitting diodes. 20, 21 and 22 are transistors for driving the light-emitting diodes. 23 and 24 are the transistors for controlling the transistors 21 and 22. 25 is the base resistance for transistor 20. 26 and 27 are the time limiting resistances for generating the reference-time pulses together with capacitors 30 and 31. 28 and 29 are the discharge resistances for capacitors 30 and 31. 32 and 33 are the resistance and Zenner diode for improving the voltage characteristic of the reference-time generating circuit, constituting a constant-voltage circuit. 34, 35 and 36 are the antireversing diodes of the feedback loop turning only one light-emitting diode on at all time. 37 and 38 are the diodes for blocking the reversing signal from the exposure-time controlling circuit. 30 and 40 are the base resistance of transistors 23 and 24.

The present example shows a case in which three light-emitting diodes 14, 15 and 16 are provided. The diode 14 gives a warning when the brightness surpasses the controlling capacity of the shutter, that is, over-exposure warning indication, 15 indicates the EE interlocking range, and 16 warns against EE interlocking movement in long time such as hand shaking condition.

The theory of operation is as follows:

The operation of the exposure-time controlling circuit is effectuated in the following sequence: by depressing the release lever (not shown in the drawing), the shutter is opened, and in an interlocking movement with this operation, the power source switch 2 is switched over from the contact a to b. In case AUTO - MANUAL selector switches 5 and 9 are both turned on to AUTO side A (as shown in the drawing), the capacitor 4 is charged with the current corresponding to the resistance value of the photo-conductive element 6, that is, the brightness of the object. On the other hand, the detecting level of the voltage detecting circuit 8 is determined by the diaphragm value or resistance 10 selected by the film sensitivity. Therefore, when the charge voltage of the capacitor 4 attains to this level, a cut-off signal of the current to the magnet 13 controlling the closing of the shutter, will be sent out. That is, the potential at the point P of the drawing will be reversed from the negative side of the power to the positive, and controlling material for closing mechanism of the shutter which has been, hitherto, retained by the magnet 13, will be released simultaneously with the demagnetization of the magnet, thus closing the shutter. In other words, the exposure time of the shutter is controlled in response to the intensity of the light from the object, diaphragm value or film sensitivity. And the potential at the point P directed to the display circuit (whose details will be described later) is picked up as the reverse signal from (−) to (+).

The operation of the warning display circuit is as follows:

The switch 3 for the warning display is a button independent from the shutter release, used for effectuating a change-over operation from the contact a to b so that by manipulating this switch, opening and closing operation will not take place. However, from the viewpoint of the electric circuit, the same is operated in a manner equal to that of shutter operation, that is switching of the switch 2. The display unit is composed of Block N with light-emitting diode 14 indicating OVER (overexposure), Block M with light-emitting diode 15 showing CORRECT (exposure), and Block L with light-emitting diode 16 displaying LONG TIME being the three light-emitting diodes 14, 15 and 16 connected to the collectors of transistors 20, 21 and 22, respectively and to the positive (+) side of the power source. And by making the above-mentioned transistors conductive, the light is turned on in the display unit. Between each one of the above-mentioned Blocks, a feedback loop is formed through diodes 34, 35 and 36, and when the light-emitting diode 16 is lit, the collector level of Transistor 22 will be lowered, and the base potential of Transistors 21 and 20 will be suppressed through the above-mentioned diodes 36 and 34. Therefore, as Transistors 21 and 20 can not become conductive, other light-emitting diodes 15 and 14 will not be lit. Likewise, when the light-emitting diode 15 is turned on, as the base of Transistor 20 is suppressed through the diode 35, the light-emitting diode 14 cannot be lit, making only one luminous indication among OVER , CORRECT and LONG TIME possible. The correct exposure displaying block M and the long time display block L are provided with RC delay circuits (26, 30) and (27, 31), respectively, and they function as means of generating reference time width pulses referred to the initial part of the present specification. The time constant of the delay circuit for resistance 26 and capacitor 30 is set to the interlocking movement limit time T1 of the high speed side, and the time constant for resistance 27 and capacitor 31, to the shaking limit time T2. The resistances 28 and 29 are for discharging each capacitor and their resistance value is larger than the resistors for time limiting 26 and 27. These time limiting circuits are applied to the base of Transistors 21 and 22 for driving the light-emitting diodes 15 and 16 as the input. Therefore, if the exposure time signal from the shutter side is not taken into consideration, when the power is supplied to the display unit, first, the light-emitting diode 14 (OVER display) will be lit, then after elapsing of time T1, the light-emitting diode 15 (CORRECT display) will turn on and, at the same time, the light-emitting diode 14 will turn off. Further, after T2, the light-emitting diode 16 (LONG TIME display) will turn on, extinguishing all other luminous indications.

In such composition, when a display function stop signal from the shutter controlling unit is applied to each one of the display Blocks M and L (CORRECT and LONG TIME displays, respectively) as an input, the display circuits that should be lit in sequence, will be retained under the state when the function stop signal has been received.

Such operation is made possible through the functioning to be explained in the following:

The function stop circuit referred to above is composed of Transistor 23 whose collector - emitter are connected to (−) side of the power source and to the base of Transistor 21 for driving the CORRECT exposure mechanism; Transistor 24 whose collector - emitter are connected, likewise, to (−) side of the power source and to the base of Transistor 22 for driving LONG TIME display mechanism; and the base resistances 39 and 40 of the above-mentioned transistors 23 and 24, both of which are connected to output terminal point P of the shutter control circuit. The Diodes 37 and 38 are anti-reversing diodes located in the self retaining feedback circuit for retaining the displaying state.

The operation of the circuit is made in the following way:

First, in case the brightness of the object is very bright so much so that it surpasses the controllable range of the shutter (that is, at the time of warning against the over-exposure), the switch 3 will be changed over to the contact b side, thus, turning on the power supply, and the capacitors 4, 30 and 31 will start to be charged through their respective resistances 6, 26 and 27. In case the object is bright, first the shutter control circuit will be inversed and the point P will transfer from the negative potential to positive potential. In this case, though Transistor 20 is conductive from the moment when the power has started to be supplied, the other display mechanism driving Transistors 21 and 22 are not in a conductive state since Capacitors 30 and 31 are still in the state of being charged. At this moment a display circuit function stop signal (potential inversion from negative to positive at Point P) is sent out from the shutter control circuit and it is led to the base of Transistors 23 and 24 through Resistances 39 and 40, making these transistors conductive and suppresses Transistors 21 and 22 so that they should not be conductive. Therefore, only the light-emitting diode 14 for OVER display will be lit.

Then, in case of the exposure within the range of EE interlocking movement and the same being of second time shorter than the swing limit (that is, in case of CORRECT exposure indication), when the power source switch 3 is turned on, the light-emitting diode 14 for warning against the OVER exposure will be lit, and after elapsing shutter controllable time limit T1, the light-emitting diode 14 for warning against OVER exposure will be turned off, lighting the light-emitting diode for CORRECT exposure display. After this, since a display circuit function stop signal is issued from the shutter control circuit, CORRECT exposure display mechanism driving Transistor 21 will retain its lighting status by means of the self retaining feedback circuit including Diode 37. The LONG TIME display block will stop its function of the time limiting circuit by making Transistor 24 conductive, so that the light-emitting diode 16 will not be lit. With these operations, only CORRECT exposure display is made possible.

In another case, that is, that of EE interlocking movement, when the exposure time exceeds the hand shaking limit, the light-emitting diodes located in each display block will be lit in sequence, first OVER, CORRECT the LONG TIME in this order, but since they receive a display function stop signal from the control circuit A, the Block L for displaying LONG TIME will self retain its lighting status alone, but will turn off, simultaneously, the other luminous displays by means of the feedback circuit. Consequently, in this case also, only the light-emitting diode 16 for warning against LONG TIME will be lit.

The above-mentioned display functions permit, also in case the shutter is manipulated, during the operation, to give indications to the effect that it is under operation by lighting the light-emitting diode in accordance with the length of exposure time.

As detailed above, the present design is characteristic of having a feedback circuit linking each display block for lighting only one display element, and self-retaining feedback applied for retaining the lighting status, as well as a formation of the circuit taken into consideration of time difference by means of the display function stop circuit coming from the shutter control circuit. And, for the display circuits of conventional type with time comparison system, a large number of component parts were needed for composing such circuits, thus making them extremely complex. But if we assume such circuit composition as mentioned above, the construction of the same will become very simple and it can be achieved with only simple and general-use electric parts and elements. Also from the viewpoint of making the system one unit for simplicity's sake, the new circuit composition according to the present invention is provided with more practical advantages: it can dispense with a large number of cords, since it needs only three of them for its external connection, and many adjustment can be performed within the display unit itself without having to track down the whole structure.

In this particular example given hitherto, light-emitting diodes have been used as luminous display elements, but they may be substituted by other types of display elements such as, for instance, lamps, etc. Also it is possible to display the shutter speed to be controlled as an indication of exposure determining factor, besides the three-step displays of OVER, CORRECT exposures and LONG TIME indications referred to in this specifications.

We claim:

1. A warning display device in an electric shutter of a camera having an exposure time control circuit for determining the exposure time of the electric shutter in dependence upon at least the brightness of an object being photographed and developing an exposure time signal in dependence upon said brightness; said warning display device including a warning display circuit comprising a first stage circuit (N) having an over exposure indicating element (14) and a single transistor (20) for driving said over exposure indicating element; a second stage circuit (M) and a third stage circuit (L); each of said second stage circuit and said third stage circuit having a corresponding display inidicating element (15, 16), a driving transistor (21, 22) for driving the corresponding display indicating element, an RC integrating circuit (26, 30, 27, 31) directly connected to the base of the last-mentioned driving transistor (21, 22) and a clamping transistor for clamping the corresponding driving transistor upon said warning display circuit receiving an exposure time signal from said exposure time control circuit, diode means (34, 35, 36, 37, 38) connected for feedback among the first, second and third stages of the warning display circuit and between the warning display circuit and the exposure time control circuit for preventing signals energizing one stage display indicating element from energizing the display indicating elements of the other stages; means including a switch for controlling operation of said exposure time control circuit; connections from said exposure time control circuit for applying said exposure time signal to said warning display circuit; and each RC circuit developing a corresponding independent reference signal for comparison with said exposure time signal for control of operation of a corresponding display indicating element.

* * * * *